(12) United States Patent
Déjean

(10) Patent No.: US 8,645,821 B2
(45) Date of Patent: Feb. 4, 2014

(54) SYSTEM AND METHOD FOR PAGE FRAME DETECTION

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 121 days.

(21) Appl. No.: 12/892,138

(22) Filed: Sep. 28, 2010

(65) Prior Publication Data

US 2012/0079370 A1    Mar. 29, 2012

(51) Int. Cl.
*G06F 17/25* (2006.01)
(52) U.S. Cl.
USPC .................................................. 715/246
(58) Field of Classification Search
USPC .................................................. 715/246
See application file for complete search history.

(56) References Cited

U.S. PATENT DOCUMENTS

| 6,909,805 | B2 * | 6/2005 | Ma et al. ........................ 382/170 |
| 7,912,829 | B1 * | 3/2011 | Mathes et al. ................. 707/707 |
| 2003/0123732 | A1 * | 7/2003 | Miyazaki et al. .............. 382/186 |
| 2004/0044964 | A1 * | 3/2004 | Martens et al. ................ 715/517 |
| 2006/0139492 | A1 * | 6/2006 | Ahn et al. ...................... 348/558 |
| 2006/0156226 | A1 | 7/2006 | Déjean et al. |
| 2007/0127819 | A1 * | 6/2007 | Lee et al. ....................... 382/190 |
| 2008/0114757 | A1 | 5/2008 | Déjean et al. |
| 2009/0089660 | A1 * | 4/2009 | Atkins et al. .................. 715/243 |

OTHER PUBLICATIONS

U.S. Appl. No. 12/853,461, Déjean, et al.
U.S. Appl. No. 12/773,125, Déjean.
Shafait, et al. "Geometric Layout Analysis of Scanned Documents," PhD Thesis, Technical University of Kaiserslautern, 2008.
Shafait, et al. "Document cleanup using page frame detection," IJDAR 11:81-96, Sep. 30, 2008.

\* cited by examiner

*Primary Examiner* — Doug Hutton, Jr.
*Assistant Examiner* — Tionna Smith
(74) *Attorney, Agent, or Firm* — Fay Sharpe LLP

(57) ABSTRACT

A system and method for page frame detection for pages of a document are disclosed. The method includes receiving a set of document pages for a document, each page having at least one detected object. For each page in the set, the method includes determining dimensions of bounding box which encompasses the detected objects of the page and determining margin dimensions, based on a position of the bounding box on the page. A page frame is computed as a combination of bounding box dimensions and margin dimensions, based on frequencies of the bounding box dimensions and margin dimensions computed for the set of pages. The computed page frame is matched to pages of the document. Information based on the matching, such as content of text objects within the matched page frame, can be output.

19 Claims, 12 Drawing Sheets

SYSTEM AND METHOD FOR PAGE FRAME DETECTION

CROSS REFERENCE TO RELATED PATENTS AND APPLICATIONS

The following copending applications, the disclosures of which are incorporated herein by reference in their entireties, are mentioned:

U.S. application Ser. No. 12/853,461, filed Aug. 10, 2010, entitled OPTICAL CHARACTER RECOGNITION WITH TWO-PASS ZONING, by Hervé Déjean and Jean-Luc Meunier.

U.S. application Ser. No. 12/773,125, filed May 4, 2010, entitled SYSTEM AND METHOD FOR UNSUPERVISED GENERATION OF PAGE TEMPLATES, by Hervé Déjean.

BACKGROUND

The exemplary embodiment relates to document processing. It finds particular application in connection with a system and method for the unsupervised detection of page frames applicable to a given document.

To enable processing of a book in digital form, it is often necessary to scan a hardcopy book. The pages can then be OCR processed or otherwise analyzed digitally. One problem which arises is that when a page of a book is scanned or photocopied, there is often what is referred to as noise in addition to the content of the current page. The noise may be "textual noise," which in the present context is content of a neighboring page (a page which is previous or subsequent to the current page being scanned). The textual noise may be text content or, in some cases, image content. Additionally, there may be "non-textual noise" which is generally noise which does not arise from the content of the current or neighboring pages. Non-textual noise can include, for example, black borders around the document page and speckles, often arising from the spine, which creates a shadow in the margin between the current page and the neighboring page.

It is desirable to remove such noise before further processing of the scanned document pages. Various methods have been developed for identifying what is referred to as the "page frame" (also called the "page body" or by typographers, "type area"). These include filtering out non-textual noise and identification of connected components. The aim of many of these approaches is generally to identify "the smallest rectangle that encloses all the foreground elements of the document page." See, for example, Faisal Shafait, Geometric Layout Analysis of Scanned Documents, PhD thesis, Technical University of Kaiserslautern, 2008. A related function found in some OCR engines is the Dual Splitting function, (such as in ABBYY FineReader™). This function recognizes the situation where the input image is composed of two pages, when two consecutive pages of a book are scanned.

One problem with current approaches is that a portion of a neighboring page may be considered as part of the current page. The approach of Shafait can lead to two pages of a book having very different smallest rectangles. For example, a page with a large amount of white space will have a smaller rectangle than one which does not. Recognition of some typographical elements, such as headers and footers, based on page location, can thus be difficult.

INCORPORATION BY REFERENCE

The following references, the disclosures of which are incorporated herein by reference in their entireties, are mentioned:

U.S. Pub. No. 2006/0156226, published Jul. 13, 2006, entitled METHOD AND APPARATUS FOR DETECTING PAGINATION CONSTRUCTS INCLUDING A HEADER AND A FOOTER IN LEGACY DOCUMENTS, by Déjean, et al.; and U.S. Pub. No. 2008/0114757, published May 15, 2008, entitled VERSATILE PAGE NUMBER DETECTOR, by Hervé Déjean, et al.

BRIEF DESCRIPTION

In accordance with one aspect of the exemplary embodiment, a method for page frame detection for pages of a document includes receiving a set of document pages for a document, each page having at least one detected object. For each page in the set, the method includes determining dimensions of a bounding box which encompasses the detected objects of the page and determining margin dimensions, based on a position of the bounding box on the page. A page frame is computed as a combination of bounding box dimensions and margin dimensions, based on frequencies of the bounding box dimensions and margin dimensions computed for the set of pages. The computed page frame is matched to pages of the document to detect page frames for the matched pages. Information is output based on the detected page frames. One or more of the receiving, determining, computing, and matching can be performed with a computer processor.

In another aspect, a system for page frame detection for pages of a document includes memory for storing a set of document pages for a document in which objects in the pages have been detected. A bounding box computing component computes, for each page in the set, dimensions of a bounding box which encompasses any detected objects of the page. A margin computing component determines, for each page in the set, margin dimensions, based on a position of the bounding box on the page. A histogram computing component computes a first histogram of bounding box dimension frequencies over all pages in the set. The histogram computing component separately computes a second histogram of margin dimension frequencies over all pages in the set. A page frame detection component computes a page frame as a combination of bounding box dimensions and margin dimensions, based on the histograms of frequencies of the bounding box dimensions and margin dimensions. The computed page frame is compliant with dimensions of the document pages. This component matches the computed page frame to the set of pages of the document to detect page frames for pages in the set. At least one of the components may be implemented by a computer processor.

In another aspect, a method for page frame detection for pages of a document includes receiving a set of pages generated by scanning a document and detecting text objects within the document pages, the set of pages comprising a sequence of consecutive or alternating pages of the document. For each page in the set, height and width dimensions of a bounding box which encompasses all detected text objects of the page are determined. Margin dimensions, based on a position of the bounding box on the page, are also determined. Bounding box dimensions are ranked, based on respective frequencies of the determined height and width dimensions for the set of pages. Separately, margin dimensions are ranked, based on respective frequencies of the four determined margin dimensions for the set of pages. A page frame is identified by combining frequent ones of the ranked bounding box dimensions and frequent ones of the ranked margin dimensions, the page frame comprising a height and width and four margin dimensions. The method further includes confirming that the identified page frame is compliant with dimensions of the pages in the set of pages. The computed page frame is matched to pages of the set. This includes determining, for at least some of the pages in the set, an anchor point and using the anchor point as a reference for positioning a page frame on the respective page, whereby at least some of the pages of the document have a page frame of the same height and width as the computed page frame. These pages are transformed by extracting text objects only from within the matched page frame.

DETAILED DESCRIPTION

Figure 1:
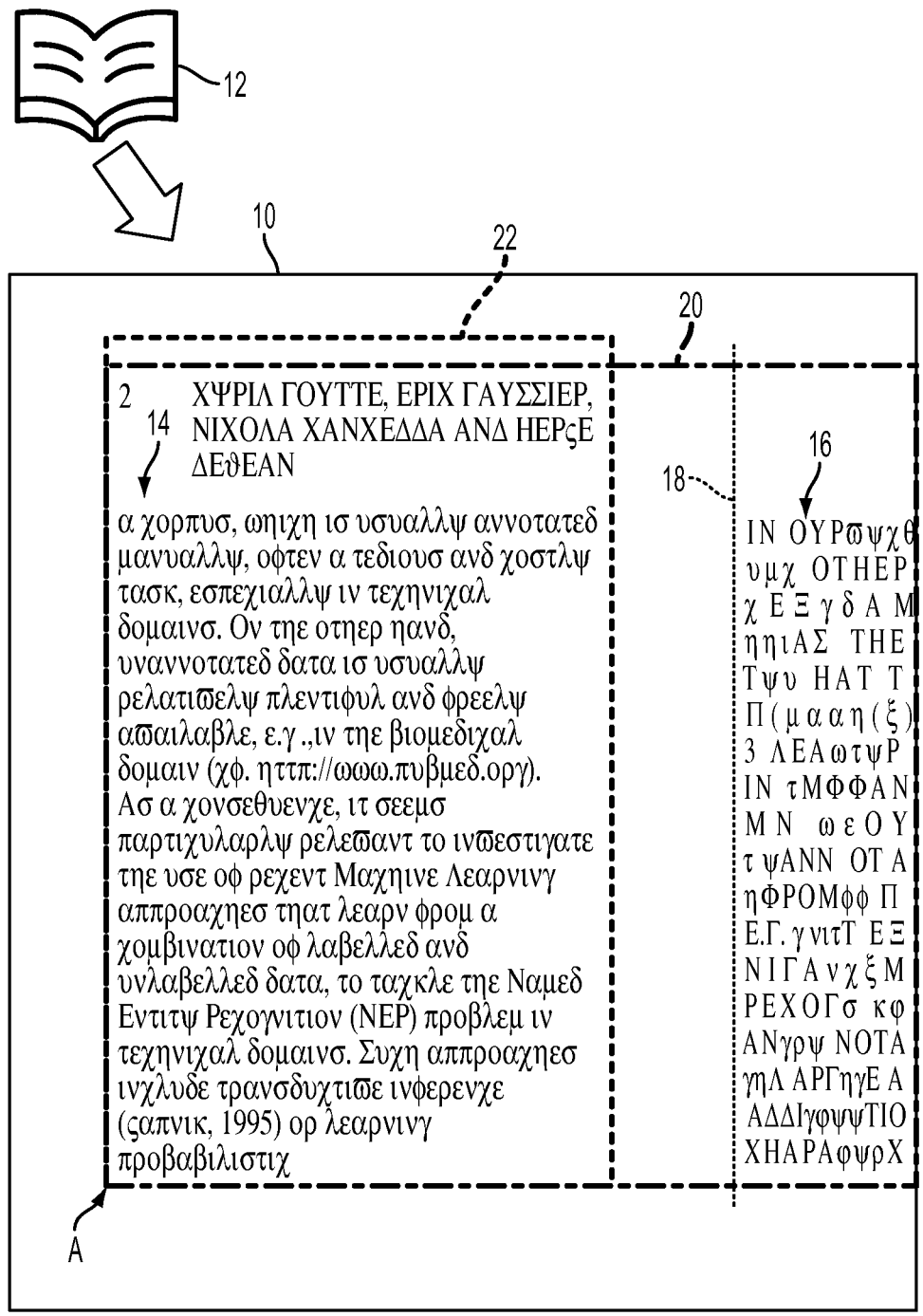
FIG. 1 is a schematic view of a scanned page of a book illustrating a page frame and a bounding box.

Aspects of the exemplary embodiment relate to the detection of page frames for pages of a scanned document. The page frame is computed at the document level, which simplifies the method compared to existing methods which work entirely at the page level.

The exemplary method/system computes a page frame for document pages based on a separate detection of margins and a bounding box, and matches the page frame to a document page by computing an optimum position for the computed page frame on the document page. In this way, noise can be largely excluded from the page frames of the document pages.

The advantages of detecting a reliable page frame are numerous in document analysis, and are not limited to scanned documents. They include noise removal for OCR, reliable element positioning (in terms of relative position with regard to the page frame), as compared to positioning relatively to the page, and improved and correct zoning, finding application in above-mentioned U.S. application Ser. No. 12/853,461, where the identification of some document objects, among them the page frame, is used to post correct zoning and OCR.

A "document" is used herein to mean an electronic (e.g., digital) or physical (e.g., paper) recording of information. In one exemplary embodiment, a hardcopy document, such as a book, is scanned to provide a set of scanned document pages (page scans) from the same document, each page scan comprising a bitmap. At least some of the bitmaps comprise arrangements of pixels that are recognizable by an OCR engine as text elements. A scanned document can thus be a collection of multiple page scans ("pages"). The set of pages processed in the exemplary method may comprise at least four pages or at least fifty pages from a single document, and may comprise all pages of a document. The document can be of any number of pages, such as up to 1000 pages or more. The method and system are particularly suited to scanned pages. However, it is also applicable to pages in a page description language such as PDF which are converted to another format where some noise is introduced in the conversion. For convenience, reference will be made throughout to scanned pages which have been processed to identify content, bearing in mind that other formats are also contemplated.

Each OCR-processed page scan can be considered to contain zero or more objects, the objects including text objects (such as page headers, footers, main text blocks, lines of text, etc.) and/or non-text objects (such as graphical or photographic images). In addition to the page content (i.e., objects derived from the original hardcopy document page) the page scan may also include noise, such as textual and/or non-textual noise. The textual noise, and in some cases, the non-textual noise, may be recognized as objects of the page by the OCR engine.

A "page frame" is defined as a (rectangular) page zone where the page content elements are laid out. The page frame is a complementary zone to the page margins. Together, the page frame and page margins encompass the entire page. In the exemplary embodiment, to compute this rectangle, additional information other than the current processed page is employed. The page frame is computed considering all (or at least some) of the pages of the document. Since the page frame is identified on a multiple page (e.g., overall document) basis, rather than for each individual document page, the page frame assigned to a page scan may not exactly match the page content of that page. The page frame for a given page can thus include, within it, white space at one or more of top, bottom, and sides of the current page content objects and can exclude some objects, which are ideally objects from a neighboring page. This contrasts with the conventional definition of a page frame as being the smallest rectangle which encompasses the page content objects.

This definition of a page frame has several advantages over existing definitions:

1) It can provide a better description of the page layout, especially by integrating white space zones into the page frame zone (this definition is also more adapted to noise detection as shown in U.S. application Ser. No. 12/853,461);

2) It can be more consistent with regard to typographical concepts; and

3) It can allow for a robust and very fast method when working at the document level.

A "bounding box," as used herein, is the smallest rectangle that encloses all the detected objects of a page scan (a document image) and is computed for each page of the document. The detected objects, e.g., those detected through optical character recognition (OCR), can include text objects of a current page, but can also include detected images (where the OCR processor detects images) and can include textual noise detected on an adjacent page. As will be appreciated, for a given scanned document page, the bounding box may be smaller or larger than the assigned page frame.

For example, as shown in FIG. 1, a schematic drawing of a digital page 10 generated by scanning a page of a hardcopy book 12 is shown. The page 10 includes page content 14 of a current page as well as noise. The exemplary noise includes textual noise—scanned text content 16 of a subsequent page as well as non-textual noise—a shadow 18 from the spine of the scanned book 12. OCR processing to identify the text content of the scanned page 10 may result in the generation of a bounding box 20, which surrounds both the page content 14 of the current page and the noise 16. The present method detects a page frame 22 for the page 10 though detection of the bounding and margins of a plurality of (i.e., some or all of) the pages in the scanned document.

Figure 2:
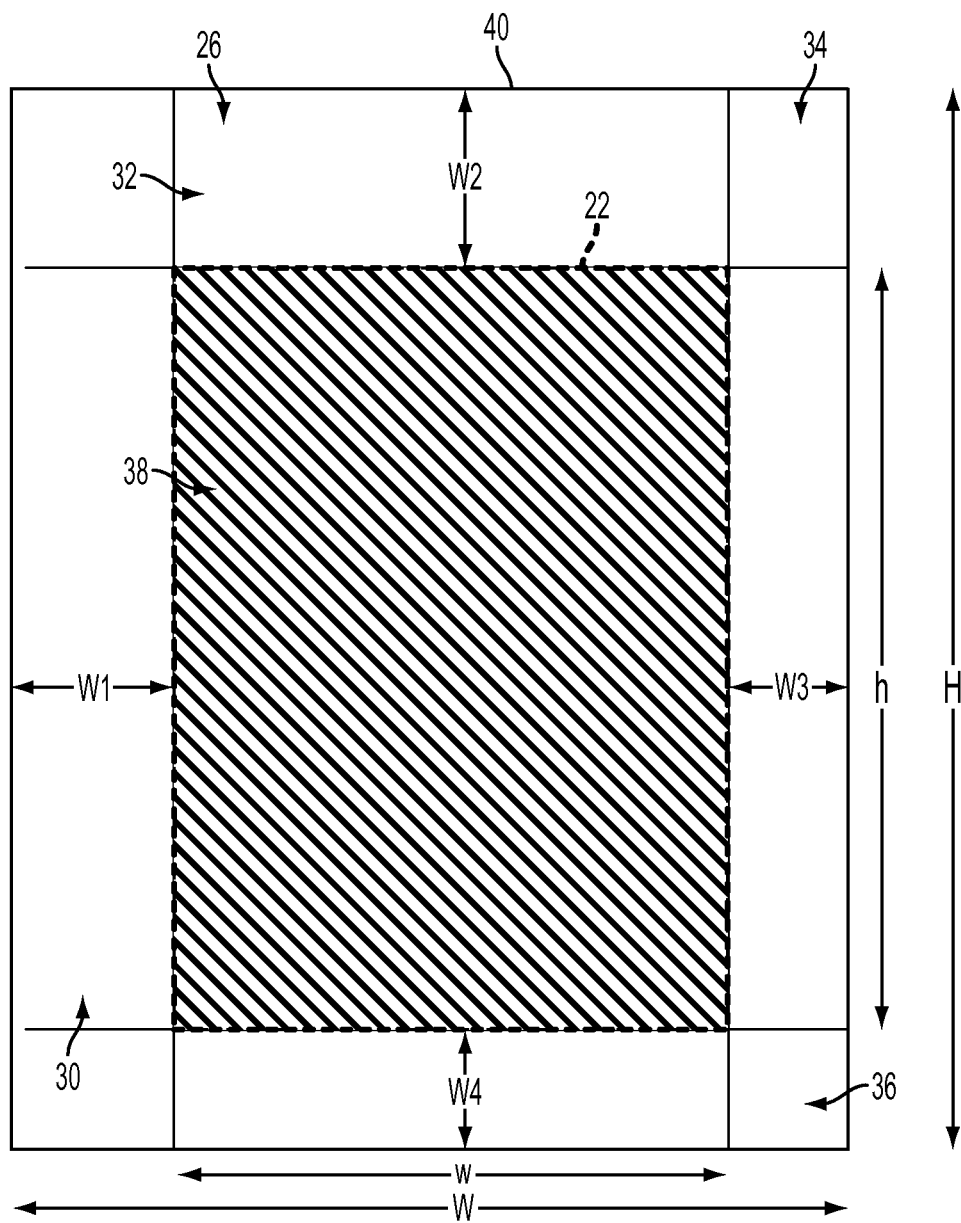
FIG. 2 illustrates a page frame.

As illustrated in FIG. 2, a page frame 22 of a generic page 26 can be defined as the couple:

pageFrame=[(h,w),(w1,w2,w3,w4)]

The first element (h,w) of the couple, corresponds to the dimensions of the page frame 22 (its height h and width w). The second element (w1,w2,w3,w4), corresponds to the width of each of the four margins 30, 32, 34, 36 created by the page frame in the page. Each margin width corresponds to the distance (expressed horizontally in the case of left and right margins 30, 34, and vertically in the case of top and bottom margins 32, 36) from the perimeter 38 of the page frame 22 to the perimeter 40 of the page 26. The margins 30, 32, 34, 36 and page frame 22 are two complementary elements which define the page 26.

The first element of the couple is referred to herein as the "page frame dimensions" and the second element is referred to as the "margin dimensions." Although one element of the couple is redundant, they are both computed and used differently in the method, as described below. Computing the margin dimensions is useful to cope with noise and pages with little page content. Both pieces of information are computed separately, and are used to validate each other. As will be appreciated, not all of the computed page frames for a given document have four margins. For example, one or more edges of the page frame 22 may be colinear with the page perimeter 40.

In general, the following page dimension constraints are satisfied for a page frame:

$h+w2+w4=H,$     1.

$w+w1+w3=W,$     2.

$h \leq H,$ and     3.

$w \leq W,$     4.

where H and W are the height and width of the page 26, respectively. H and W may correspond to the entire height and width of the scanned page. In some embodiments, however, the scanned page may be preprocessed to remove (typically black) border regions. The scanned page may also be processed to remove skew, so that detected lines of text are horizontally aligned with the page perimeter. If so, the pages may be normalized to a common height H and width W.

It should be noted that, knowing the page dimensions and the margin position (left, top, right, or bottom), only one measure is sufficient to characterize each margin, which is referred to as its width. The distances h, w, w1, w2, w3, and w4 can be expressed in any suitable units, such as number of pixels, millimeters, inches, or the like.

Figure 3:
FIG. 3 illustrates a page frame applied to a page which is only partially filled with text.

The exemplary method allows a page frame to be assigned to a page which is larger than the detected page content. For example, as illustrated in FIG. 3, a page scan 10 includes page content 14 which does not fill the assigned page frame 22. Part of the page frame thus includes blank space 42.

Figure 4:
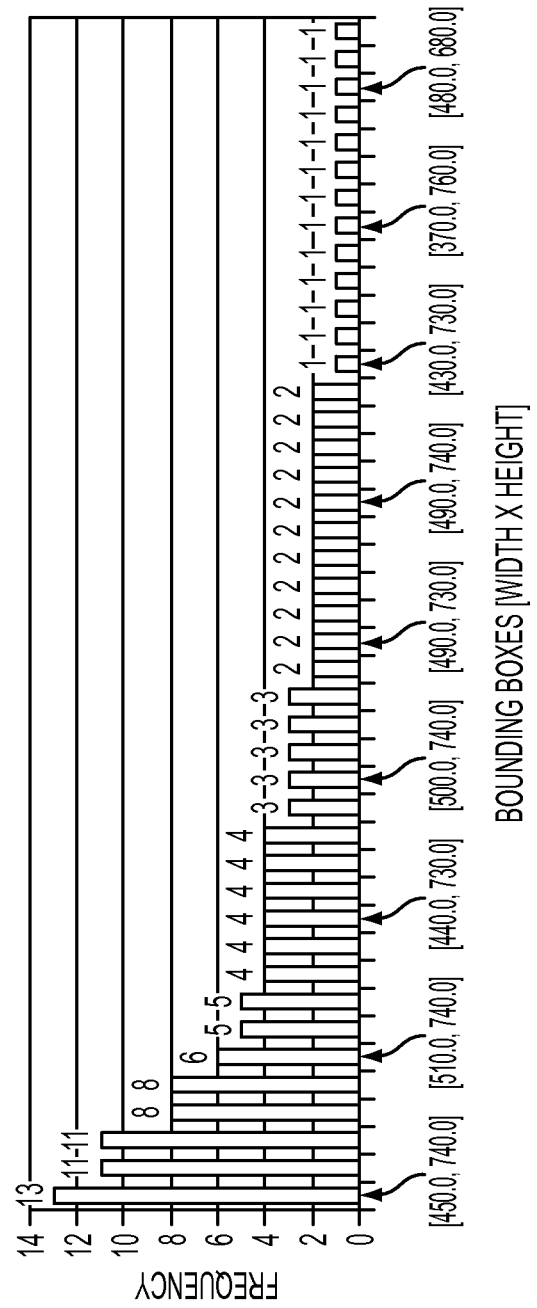
FIG. 4 is a histogram of frequency vs. bounding box dimensions (width and height) for pages of an exemplary document.
Figure 5:
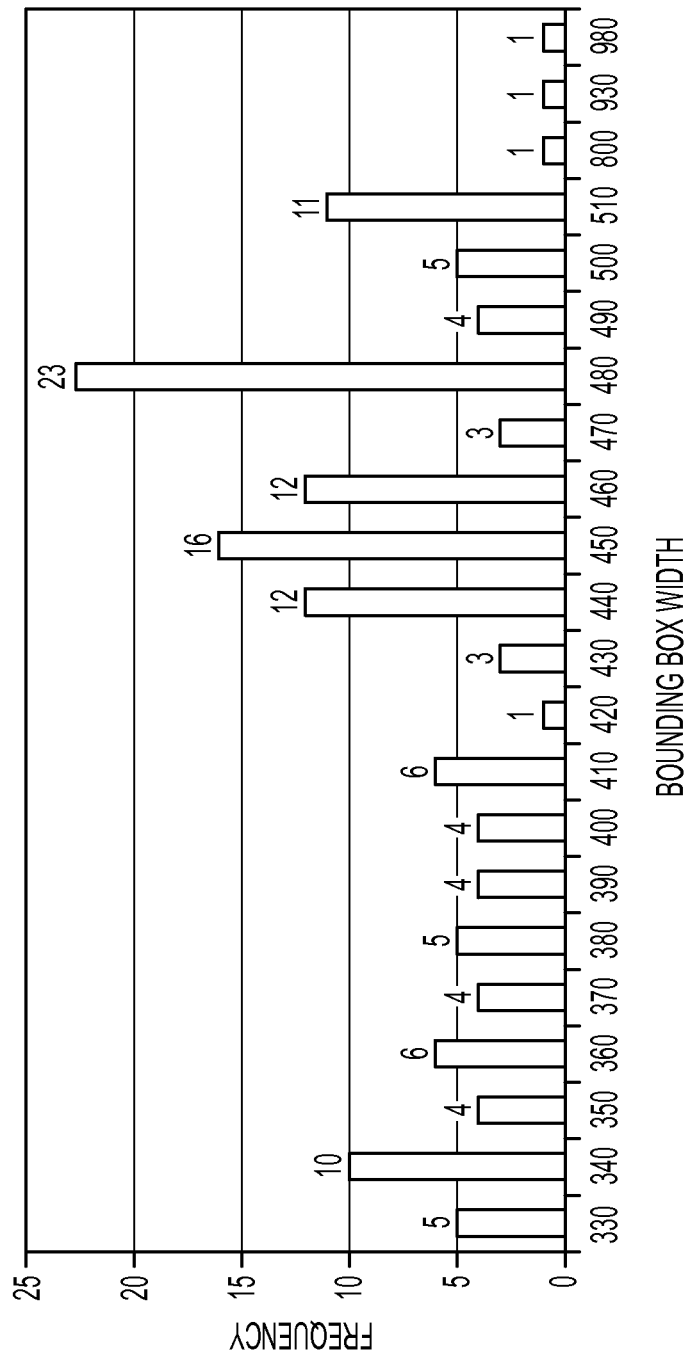
FIG. 5 is a histogram of frequency vs. bounding box width for pages of the exemplary document of FIG. 4.
Figure 6A:
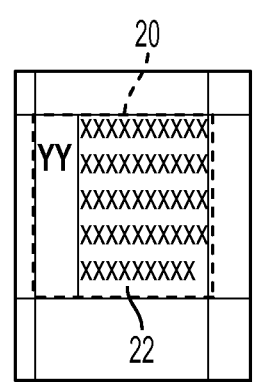
FIG. 6 schematically illustrates four hypothetical pages of an exemplary document with bounding boxes, with a page frame of the same height and width applied to all pages.
Figure 6B:
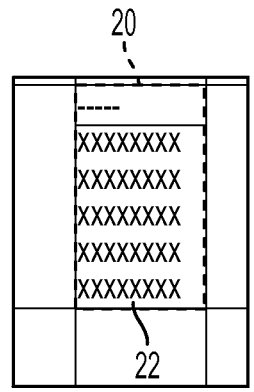
Figure 6C:
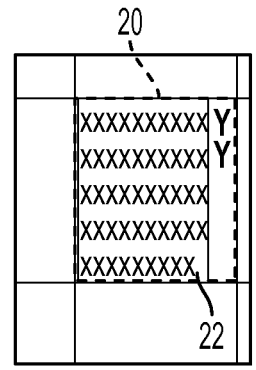
Figure 6D:
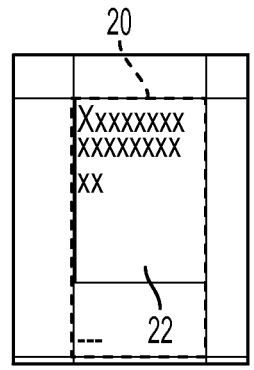

To demonstrate how the separate computation of page frame dimensions and margin dimensions can be beneficial, consider the following example. A frequency histogram of the content bounding boxes for all the pages of an exemplary 140 page document can be computed, as illustrated in FIG. 4. The most frequent bounding box could be considered as the page frame dimensions (here 450×740, which occurs 13 times). However, this can be shown to be incorrect: as shown in FIG. 5, if the h and w dimensions are considered separately, the most popular width is actually 480 (the height was correct in this example). The problem is compounded when a frequency histogram is plotted which takes into account the margin dimensions as well as the page frame dimension.

In order to develop a general method which copes with any type of document, the following approach could be used:

1. Each page frame dimension is estimated separately: instead of counting the bounding box as a couple (h,w); the bounding box height and its width are counted independently.

2. Similarly, the four margin dimensions are estimated independently from each other and from the page frame dimension.

The advantage of doing this can be demonstrated on an illustrative document having four scanned pages A, B, C, and D, as shown in FIG. 6. The X's represent correct text content (based on the original document), the Y's represent textual noise, and - - - represents non-textual noise. Even if, as illustrated, none of the pages A, B, C, and D has a bounding box 20 corresponding to a theoretical page frame 22, the correct dimensions of the page frame [(h,w),(w1,w2,w3,w4)] can be computed by estimating separately each value, as illustrated in TABLE 1 below.

TABLE 1

Different pages with different bounding boxes and their impact on the page frame dimensions estimates

| Values | No. of correct values | No. of incorrect values |
|---|---|---|
| page frame height | 2 (pages A and C) | 2 (but different) (pages B and D) |
| page frame width | 2 (pages B and D) | 2 (but different) (pages A and C) |
| left margin width | 3 (pages B, C, and D) | 1 (page A) |
| top margin width | 3 (pages A, C, and D) | 1 (page B) |
| right margin width | 3 (pages A, B, and D) | 1 (page C) |
| bottom margin width | 2 (pages A and C) | 2 (but different) (pages B and D) |

A histogram for each of the six dimensions thus can be used to identify a single page frame 22, which if applied to each of the pages, excludes the textual noise (Y's) and non-textual noise (- - -). The content within the page frame can thus be extracted as the content of the page and the content outside the page frame can be ignored.

A problem with this approach is that for an actual document with tens or hundreds of pages, the computed page frame may not match any of the pages, since the page dimension constraints 1 and 2 above may not be satisfied. Thus, in the exemplary embodiment the couple [(h,w), (w1,w2,w3, w4)] is identified for each page, histograms are computed for all h and w couples, and for all margin combinations and page frames which are in conformance with the constraints 1 and 2 (allowing for a slight approximation) are identified.

Figure 7:
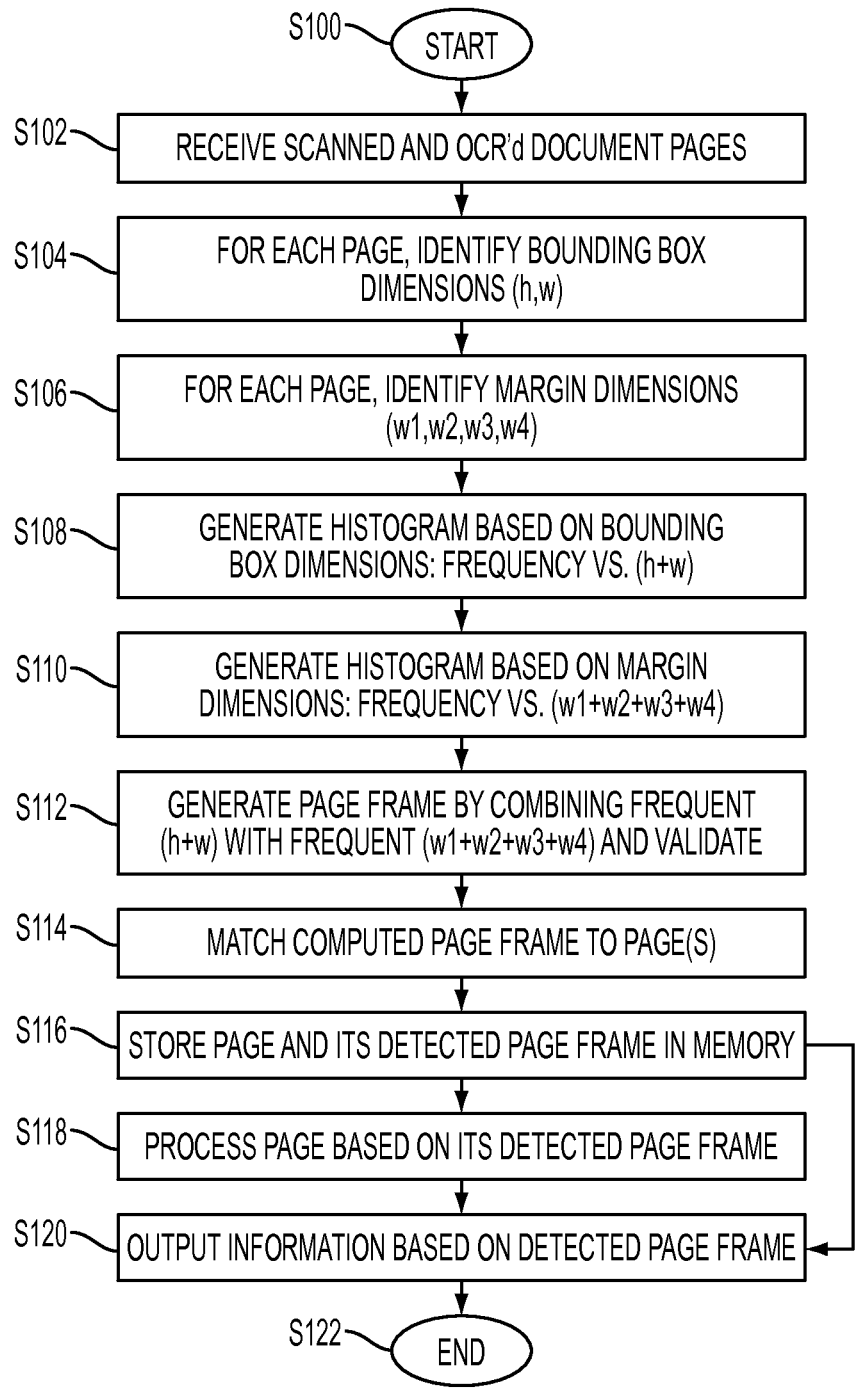
FIG. 7 is a flow chart illustrating a method for detecting page frames for electronic pages of a document.

FIG. 7 illustrates an exemplary method for page frame detection. The method begins at S100.

At S102, a set of scanned and OCR'd document pages is received. For each document page, the sizes and positions of any detected objects, as output by the OCR engine, is identified.

At S104, for each page, bounding box dimensions, height and width (h,w) are determined. Note that although in FIG. 1, the dimensions of the bounding box 20 are clearly different from those of the illustrated page frame 22, the same notation for page frame dimensions and bounding box dimensions, and their corresponding margin dimensions, is used for convenience.

At S106, for each page, the (four) margin dimensions (w1, w2,w3,w4) are determined (for left, top, right, bottom margins), based on the position of the bounding box on the page.

At S108 a first histogram is computed, based on combinations of the determined bounding box dimensions for all (or at least some) of the pages.

At S110 a second histogram is computed, based on combinations of the margin dimensions for all (or at least some) of the pages.

At S112, based on the first and second histograms, a "computed page frame" is generated by combining frequent bounding box dimensions (now, page frame dimensions) and a set of four frequent margin dimensions, with the requirement that the computed page frame is also compatible with the page dimension constraints.

At S114, the computed page frame identified at S112 is matched to some or all of the pages of the document. This is achieved, in the exemplary embodiment, by identifying an optimum position for the computed page frame (h,w) on the respective page. As a result, the margins for this detected page frame, for any given page, may be different from those of the computed page frame.

Steps S112 and S114 are repeated one or more times, of necessary, to match different computed page frames with the remaining pages of the document.

At S116, each page (e.g., a reference thereto) is linked to its detected page frame. Each page is linked to at most one detected page frame.

At S118, further processing of the pages may be performed, for example, extraction of the page content within the detected page frame (i.e., filtering out content outside the page frame as noise).

At S120, information is output. This information may include one or more of: the detected page frames (e.g., [(h,w), (w1,w2,w3,w4)] or x,y coordinates of an anchor point together with (h,w)), extracted content from the detected page frame, information based thereon, or a combination thereof.

The method ends at S122.

The method illustrated in FIG. 7 may be implemented in a non-transitory computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 7, can be used to implement the method for detection of page frames.

Figure 8:
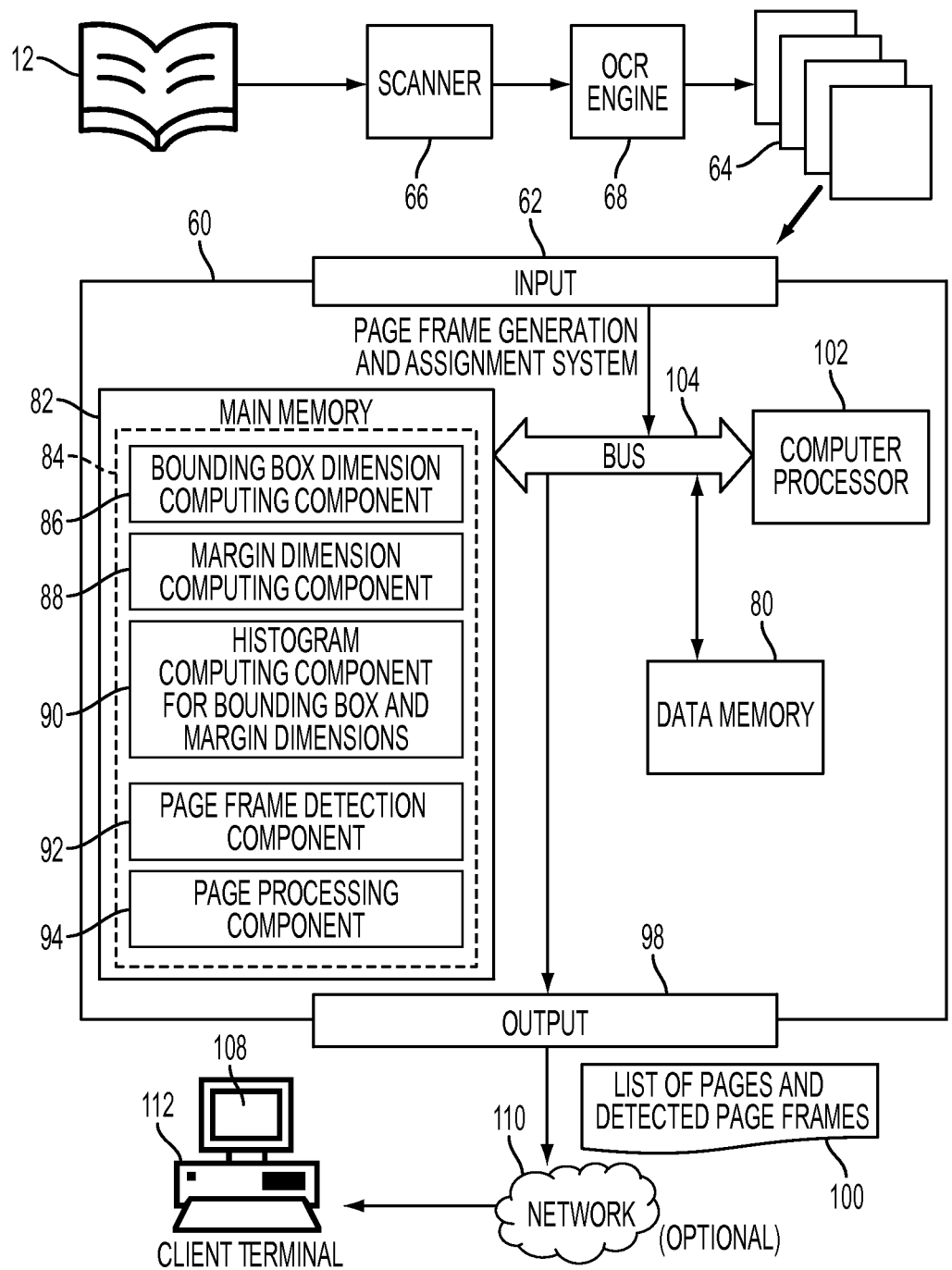
FIG. 8 illustrates a system for detecting page frames for electronic pages of a document.

FIG. 8 illustrates a system 60 which can be used for page frame detection for pages of a document. The system 60 is a non-transitory device which includes an input device 62, for receiving a set 64 of scanned and OCR'd document pages 10 for a multipage document 12. While a collection of documents could be processed, rather than a single document, the exemplary method is best suited to processing documents singly. Prior to inputting, the document pages may be stored in any suitable tangible storage media such as a disk, ROM or RAM, or may be input into the system 60 in the form of a carrier wave, e.g., via the Internet. The input device 62 may include a modem link, a wired or wireless connection, USB port, floppy or hard disk receiver, or the like and may be separated or combined with other components of the system 60. As will be appreciated, a scanner 66, or other digital image capture device, and an Optical Character Recognition (OCR) engine 68 for processing the output of the scanner to generate the set 64 of scanned and OCR'd document pages may be provided. In the exemplary embodiment, these are shown as separate components, with the input device 62 receiving the processed pages of a document therefrom, although it is contemplated that components could form a part of the system 60 (for example, the system 60 could be implemented in a scanner with an OCR engine).

Figure 9:
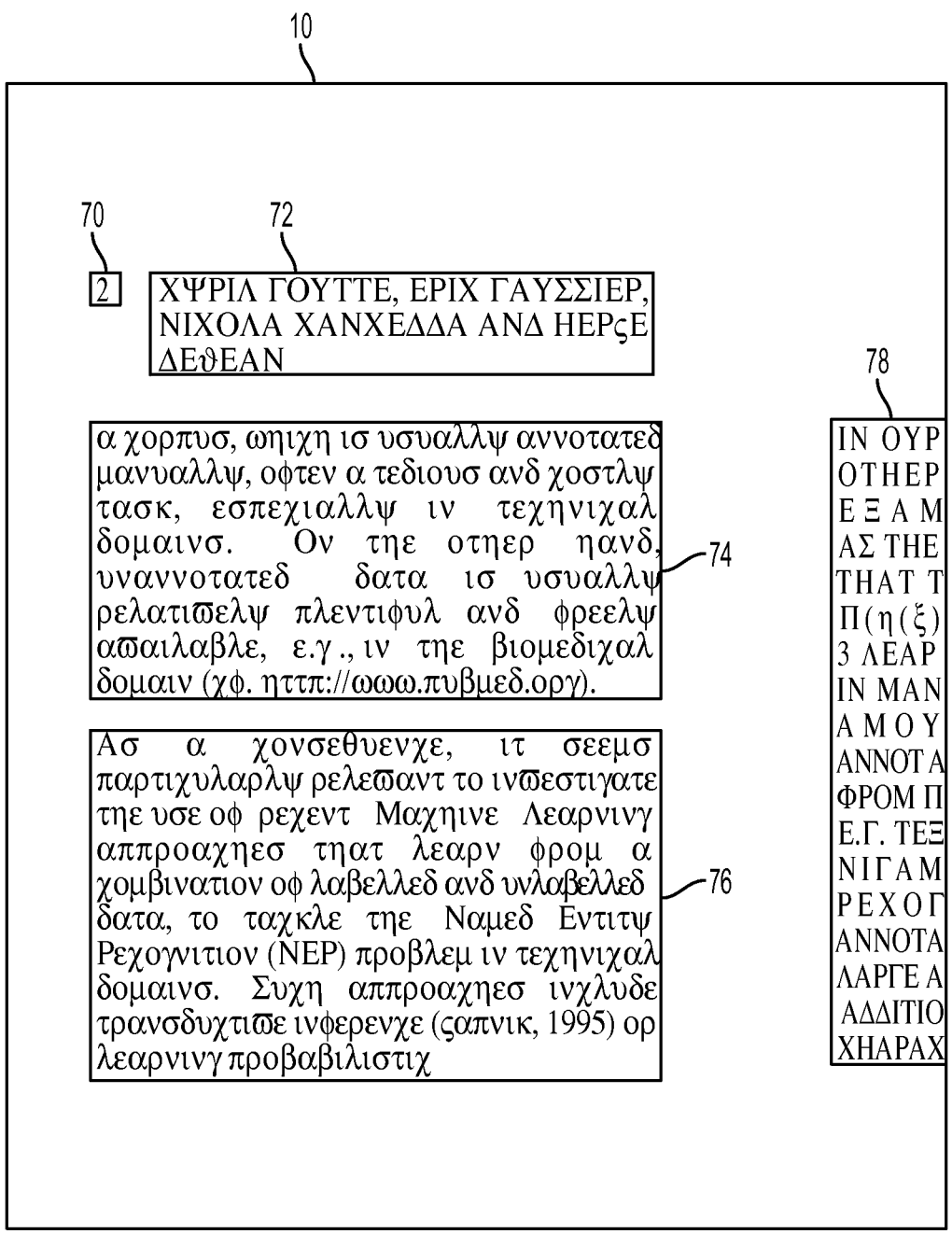
FIG. 9 illustrates a scanned page with text objects identified by an OCR engine.

The OCR engine 68 may output the positions on each page of objects which may be lines and/or blocks of the recognized text, each block comprising one or more lines of text. For example, as shown in FIG. 9, the OCR engine may output the dimensions and content of five objects 70, 72, 74, 76, 78, here text blocks, for the OCR'd text shown, based on such features such as font type, font size, spacing between text, computed margins of the text, and combinations thereof.

The system 60 includes data memory 80 for storing the document pages 64 during processing. Main memory 82 of the system 60 stores instructions 84 for performing the exemplary method, including a bounding box component 86 which, for each page of an input OCR'd document or other document to be processed, computes the bounding box dimensions (h,w) which is the minimum size to encompass all of the detected text objects (and any other detected objects, such as images) on the page. A margin dimension computing component 88 computes the margin dimensions (w1,w2,w3, w4) for the page.

A histogram computation component 90 computes a first histogram, based on the bounding box dimensions for all of the pages of the document (or at least a set of the pages, such as odd or even pages). The component 90, or a separate computing component, computes a second histogram, based on the margin dimensions for all (or the at least some) of the pages of the document.

A page frame detection component 92 computes at least one computed page frame over the document pages by combining a set of frequent bounding box dimensions (now, page frame dimensions) and frequent margin dimensions, subject to the page dimension constraints, and matches the computed page frame to pages of the document to generate a detected page frame for each of at least some (or all) of the document pages.

Optionally, a page processing component 94 processes the pages based on their corresponding detected page frames.

An output 98 of the system 60, which may be the same component as input 62, or a separate component, outputs information 100, such as a list of pages and their detected page frames and/or information based thereon, such as extracted text content.

In the exemplary embodiment, the components 86, 88, 90, 92, 94, comprise software instructions stored in main memory 82, which are executed by a computer processor 102. The processor 102, such as the computer's CPU, may control the overall operation of the computer system 60 by execution of processing instructions stored in memory 82. Components 62, 80, 82, 98, 102 may be connected by a data control bus 104.

As will be appreciated, system 60 may include fewer or more components while still having the same functionality. For example, components 86, 88, 90, 92, 94 may be combined to form fewer components, or may be functionally separated to form more individual components.

The system 60 may comprise one or more computing devices, such as a personal computer, PDA, laptop computer, server computer, or combination thereof. Memories 80, 82 may be integral or separate and may represent any type of computer readable medium such as random access memory (RAM), read only memory (ROM), magnetic disk or tape, optical disk, flash memory, or holographic memory. In one embodiment, the memories 80, 82 comprise a combination of random access memory and read only memory. In some embodiments, the processor 102 and memory 82 and/or 80 may be combined in a single chip.

The system 60 may output the information 100 to an output device, such as a display screen 108, a printer, or the like. The output device 108 may be connected directly with the system or linked thereto, e.g., via a wired or wireless link 110, such as a local area network, wide area network, or the Internet. The system 60 may generate a graphical user interface (GUI) for display to a user. The exemplary GUI (not shown) enables a user to interact with the system 60 via the display screen 108 with a user input device, such as a cursor control device, keyboard, keypad, joystick, or the like. In the exemplary embodiment display screen 108 is connected with a client computing device 112 which includes a web browser which allows the user to interact with the system 60, which may be implemented by a server computer.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Further steps of the system and method will now be described.

Input of Document pages (S102)

As input, the method/system takes a document considered as an ordered sequence of pages. Each page contains the geometrical description of its objects: their position and their shape. This kind of information is typically provided by an OCR engine 68 or page layout languages, such as PDF.

Bounding Box and Margin Dimensions (S104, S106)

For each page having one or more detected objects, dimensions of the bounding box of the page content are computed. These are the dimensions of a box of minimum size to encompass the detected objects in the page. By way of example, the dimensions (h,w) of the bounding box 20 may be computed as the smallest rectangle which encompasses the objects 70, 72, 74, 76, 78 provided at S102. Rounding may be performed (e.g., to one digit or 10 digits, for example, in the case of dimensions measured in number of pixels). The four margins (w1,w2,w3,w4) are also computed, based on the position of the computed bounding box relative to the page boundary 40.

Page Frame Dimensions Histogram (S108)

Page frame dimension couples are generated by generating all pairs (h, w). The score of the resulting page frame dimensions corresponds to the sum of their height and width frequency. As an example, consider a document with the ten pages shown in TABLE 2.

TABLE 2

| Page | Height | Width |
|---|---|---|
| 1 | 740 | 454 |
| 2 | 752 | 455 |
| 3 | 752 | 454 |
| 4 | 730 | 484 |
| 5 | 752 | 492 |
| 6 | 706 | 490 |
| 7 | 752 | 454 |
| 8 | 752 | 474 |
| 9 | 752 | 455 |
| 10 | 105 | 454 |

A few of the couples and their frequencies generated from this document are as shown in TABLE 3 (as will be appreciated, many more couples can be generated from this document).

TABLE 3

| Couple | Height Frequency | Width frequency | Score for Couple |
|---|---|---|---|
| --- | | | |
| 740, 454 | 1 | 4 | 5 |
| 740, 455 | 1 | 2 | 3 |
| 740, 474 | 1 | 1 | 2 |
| 740, 484 | 1 | 1 | 2 |
| 740, 490 | 1 | 1 | 2 |
| 740, 492 | 1 | 1 | 2 |
| 752, 454 | 6 | 4 | 10 |
| 752, 455 | 6 | 2 | 8 |
| 752, 474 | 6 | 1 | 7 |
| 752, 484 | 6 | 1 | 7 |
| 752, 490 | 6 | 1 | 7 |
| --- | | | |

The histogram of (h,w) couple vs. score is stored in ranked order, i.e., the highest scoring couple is ranked highest. In the above example, it is the couple (752, 454), with a score of 10, which is ranked the highest.

Margin Dimension Histogram Generation (S110)

Based on the content bounding box 20 of each page 10 of a given document, a frequency histogram for the left, top, right and bottom margin dimensions is computed (the width of the margin). Similarly to the bounding box histogram, all the possible 4-ples (w1, w2, w3, w4) are generated, and their score corresponds to the sum of the four respective dimension scores.

Optionally, odd and even pages are considered separately in order to cope more easily with mirrored pages (in this case the left and right margins are not identical for odd and even pages). The user may be provided with a selector, e.g., a drop down menu, or the like which allows this option to be selected. In some embodiments, this option may be a default option. Other options may be provided, such as for when the document includes different page sizes, such as A3 and A4, these different page dimensions may be treated separately.

Validating Page Frame Dimensions and Margin Dimensions (S112) and Matching Page Frames to Document Pages (S114)

The list of bounding box dimension couples (h,w) (now considered as page frame dimensions) is sorted in decreasing order of frequency, and is validated against the list of margin dimension 4-ples (w1,w2,w3,w4) sorted in decreasing order of frequency. The goal is to compute at least one page frame (i.e., page frame dimension couple, margin dimension 4-ple) [(h,w), (w1,w2,w3,w4)] which scores highly for both (h,w) and for (w1,w2,w3,w4) and which is compliant with the page dimension constraints (allowing for some approximation). An algorithm for performing this step is illustrated below as Algorithm 1 (see also Algorithm 2 below for line 9 of Algorithm 1).

As can be seen from the exemplary Algorithm 1, the algorithm is initialized with a list of page frame dimensions Lpfd (i.e., couples (h,w), sorted in decreasing order of the score output at S110 and a list of margin dimensions Lmd (i.e., 4-ples (w1,w2,w3,w4)) sorted in decreasing order of the score output at S112. A list of pages, which references the scanned pages by assigned page numbers, is also initialized. The page numbers may be assigned according to the order in the scanned document, starting with the number 1 and continuing sequentially in increments of 1 for all the pages scanned, i.e., they may not correspond to typographic page numbers within the document.

The list of page frames Lpf is initially empty. In LOOP 1, in the first step (line 1), while there are pages in the list of pages Lp which are not yet associated with a page frame, and while there is a page frame dimension pfd in the sorted list of page frame dimensions Lpfd, then at line 2, the top scoring pfd in the sorted list of page frame dimensions Lpfd is identified. At line 3 of the algorithm, the Boolean Bcompliant is initialized to False. At line 4, (LOOP 2), while there is an md in the list of margin dimensions Lmd and Bcompliant=False (i.e., notBcompliant is True), then the top element in the list of margin dimensions (i.e., the most frequent 4-ple, with the highest score) is taken. The determination of compliance between pfd and md involves checking if the dimensions of the margins in md are compliant with the page frame dimensions in pfd (a small difference is allowed to cope with noise). The allowed approximation may be given by a ratio: a difference of up to 5% or 10% of the page frame height for the y-abscissa and 5% or 10% of the page frame width for x-abscissa may be defined as acceptable in the algorithm. Thus, for example, for a page with dimensions H,W, a computed (h±10% h)+w2+w4=H or (h±5% h)+w2+w4=H and a computed (w±10% w)+w1+w3=W or (w±5% w)+w1+w3=W may be considered acceptable for compliance to be found.

At line 6 of the Algorithm, if pfd and md are determined to be compliant (admitting some variability), then at line 7, bCompliant is set to True, and at line 8, a page frame is created with the values of pfd and md (these two values are used in the matching step). At line 9, this page frame (pfd,md) is matched over the list of pages in Lp to associate the page frame with pages of the document which comply with the page frame. Further details of this step are described below. At line 10, the page frame (pfd,md) may stored in the list of page frames Lpf with reference to the matching pages. The method then proceeds to line 11, where this pfd is deleted from Lpfd (so that it will be ignored for the next iteration for LOOP 1). Similarly, at line 12, md is deleted from Lmd (so that it will be ignored for the next iteration for LOOP 1). At line 13, the matched pages are deleted from Lp (so that they will not be matched with more than one page frame). The method then returns to line 1, where the new top element in Lpfd is taken as pfd.

If the pfd and md are not compliant (at line 6), then at line 14 (Else), the method proceeds to line 15, where md is temporarily deleted from Lmd (so that it will be ignored for the next iteration for LOOP 2). The method then returns to line 4, where if there are margin dimensions remaining in the list, the new top element remaining in Lmd is taken as md. While not shown in the algorithm, at the end of this loop, md's which have been temporarily deleted from Lmd which have not been matched with the current pfd are restored to the list of margin dimensions Lmd for potential consideration with the next pfd.

---

Algorithm 1: Identifying page frames

```
Input:
Lpfd            // decreasing sorted list of bounding box
                   (page frame) dimensions:
Lmd             // decreasing sorted list of margin dimensions:
Lpf = [ ]       // list of page frames (initially empty)
Lp              // list of pages
1  While |Lp| > 0 and |Lpfd| >0:
2      pfd = top element of Lpfd
3      bCompliant = False
4      while |Lmd| > 0 and not bCompliant:
5          md = top element of Lmd
6          if pfd and md are compliant:
7              bCompliant =True
8              create a page frame as [pfd,md]
9              Match the page frame [pfd,md] up with pages in Lp
10             store [pfd,md] in Lpf (unless it matches 0 pages in
                   Lp)
11             delete pfd from Lpfd
12             delete md from Lmd
13             delete covered pages from the page list Lp
14         else
15             delete md from Lmd (temporarily, until returning to
                   line 1, when Lmd is reintitalized)
Output:
- Lpf (list of validated page frames)
- pages associated with at most one page frame.
```

---

In this algorithm, a given pfd is iteratively combined with the most frequent md remaining until a compliant combination is found. It is to be appreciated that different methods of identifying a compliant combination are contemplated. For example, a given md could be iteratively combined with the most frequent pfd remaining until a compliant combination is found.

Matching a Page Frame Against a Page (S114), Algorithm 1, line 9

Line 9 of the algorithm will now be described in further detail. This step involves matching the current computed page frame [pfd,md], which has been determined to be compliant, up with the document pages to identify an optimum position for the detected page frame on the respective matching pages.

Figure 10:
FIG. 10 illustrates candidate anchor points identified during the matching of a page frame to the page illustrated in FIG. 9.
Figure 11:
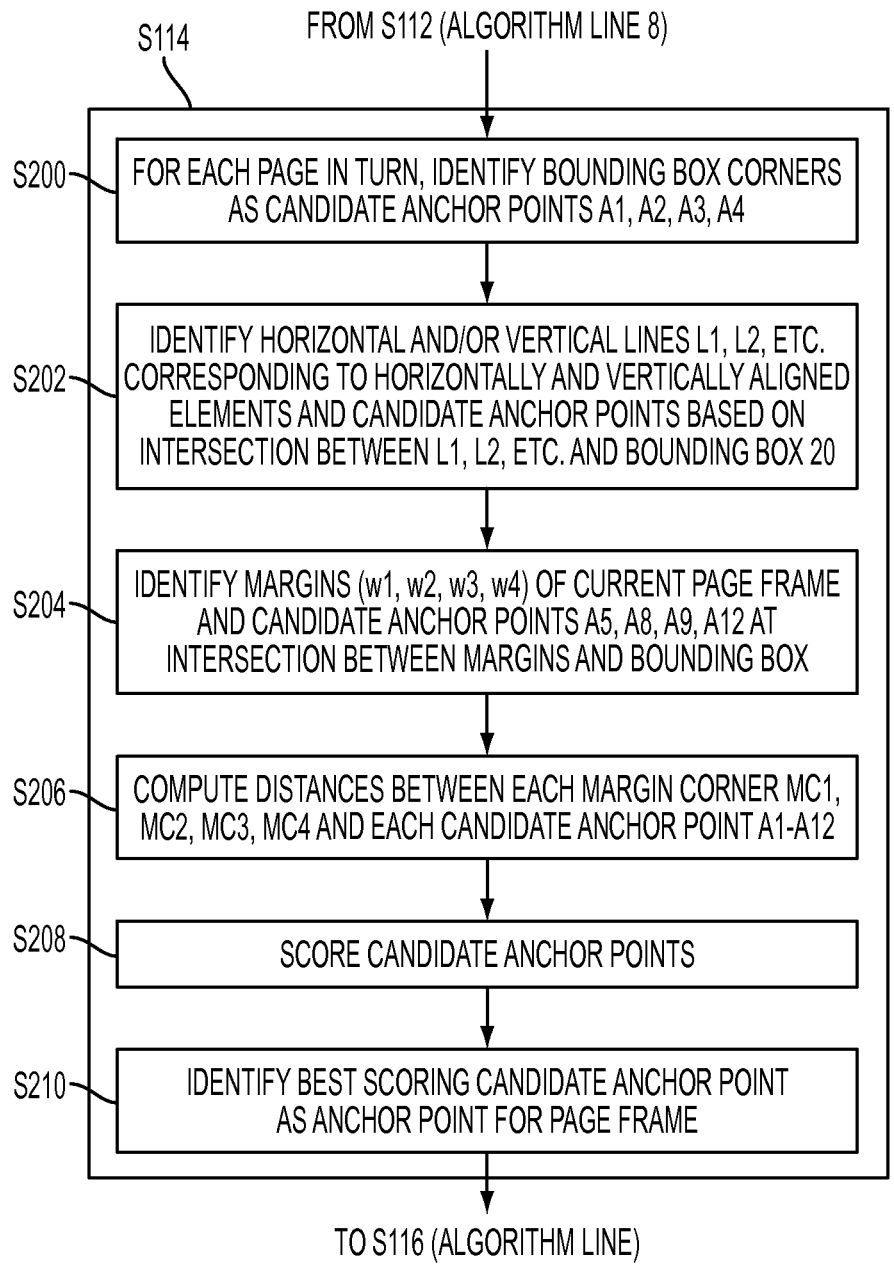
FIG. 11 is a flow chart illustrating matching of a page frame to a document page in the method of FIG. 7.

With reference to FIGS. 10 and 11, the following method may be used to perform an efficient matching. Taking the dimensions of the computed page frame (h,w), a specific point in the page, referred to as the "anchor point," is identified. The anchor point corresponds to a specific corner of the page frame at which to draw the page frame rectangle 22. The method includes identifying (by their x,y coordinates) a set of relevant points (candidate anchor points) to be scored, and to identify the best scoring point among them as the anchor point A. For this, the content of the page and the page frame margins (w1,w2,w3,w4) are used. FIG. 10 shows the different elements used for this step on exemplary page 10. First the content bounding box 20 is drawn. Each of its corners A1, A2, A3, A4 is identified as a candidate anchor point (S200). In order to cope with noise, other candidate anchor points are identified. In one embodiment lines L1, L2, L3, etc. corresponding to frequent horizontally and/or vertically aligned objects are taken into consideration. For example, in the embodiment illustrated in FIG. 10, vertical line L1 corresponds to the left hand edge of the detected objects 74, 76, L2 corresponds to the right hand edge of the objects 70, 72, 74, 76, corresponding to actual content of the current page, and L3 corresponds to the left hand edge of the object 78 containing textual noise from the adjoining page. Candidate anchor points A6, A7, A10, and A11 are identified from the intersection with the bounding box 20 (S202) (the anchor points A1 and A3 have already been identified at S200).

The four margins corresponding to (w1,w2,w3,w4) of the current page frame [pfd,md], are also drawn on the page 10. Margin corners MC1, MC2, MC3, MC4 each correspond to the intersection of two margins. Candidate anchor points A5, A8, A9, A12 are identified as the intersection between the bounding box 20 and the four margins (S204). As will be appreciated, not all the candidate anchor points generated in this step are shown for ease of illustration.

At S206, the distance between each margin corner MC1, MC2, MC3, MC4 and each of the candidate anchor points A1 to A12 is computed. While in theory, it is not necessary to compute distances to all the margin corners, the computation of distance for all candidate anchor points and all margin corners takes so little time that an algorithm for identifying the closest pairs for which to compute distances is not necessary. The distance can be computed as the Euclidian distance, e.g., in number of pixels.

At S208, each candidate anchor point A1, A2, etc. is evaluated using a scoring function. The exemplary scoring function considers two elements:

1. Its distance to each of the margin corners.
2. A number of objects intersected by the page frame if this candidate anchor point is taken as the anchor point of a page frame of dimension pfd drawn from this point.

The aim is to identify an anchor point which has relatively few intersections and which is relatively close to a margin corner. The candidate anchor point with the best (e.g., lowest) overall score on the scoring function is taken as anchor point and the page frame is positioned in the page (S210). In the exemplary scoring function, the lowest score is the best (optimal), although other scoring functions are also contemplated based on distance and number of intersections which could result in the best candidate anchor point having the highest score.

If the score is lower than a given threshold, the match between the page and the page frame is validated. Otherwise the current page frame is not associated with the page and the method may return to the next top page frame (Algorithm 1, line 1) or assign a default page frame. A possible value for this threshold is a ratio of the page frame width (currently 0.5). The rationale behind this threshold is to consider as nonreliable, a page frame location which is too far from its best margin corner.

Formally the method can be described by Algorithm 2 below:

```
Algorithm 2: match (pageFrame, page):

16    pfd, md = pageFrame
17    compute the candidate anchor points cap.
18    for each margin corner mc:
19        for each cap:
20            dist = distance between mc and cap
21            nbinteresected = number of objects intersected by the
                  page frame drawn from this cap
22            score (mc, cap) as: dist * nbintersected/nbObj
23    if lowest score (mc, cap) less than a given threshold:
          take the (mc,cap) with the lowest score as the anchor point
          and draw the page frame pfd using this cap as reference point
          (using the associated mc)
          Else:
          return: no match found
``` nbintersected is the number of objects 70, 72, 74, 76, 78 etc. intersected by the pfd drawn from the selected cap. nbObj is the total number of objects detected on the page. Thus, for example, if a page frame pfd having a height corresponding approximately to A1-A3 and a width corresponding to A1-A6 is drawn at anchor point A9 in FIG. 10, it will intersect 2 objects (74, 76) out of 5 so nbintersected/nbObj=2/5=0.4. As will be appreciated, if the OCR engine identifies lines of text as objects, rather than blocks, as shown, a slightly different value may be obtained. Where there are no intersections, such as may be the case of candidate anchor point A3 in this example (nbintersected/nbObj=0/5=0) then for convenience, such scores are given a non-null value of, for example, 0.01, i.e., the lowest possible score.

Table 4 shows the final scores of the candidate anchor points generated by the content bounding box 20 of a page 10 similar to that shown in FIG. 10, by way of example (in this example, the OCR engine identified lines of text within the illustrated boxes as objects).

TABLE 4

| Corner of bounding box as candidate anchor point | Shortest Euclidian distance to a margin corner (e.g., in pixels) dist | Intersected elements score nbObj/nbintersected | Final score |
| --- | --- | --- | --- |
| A1: top left | 37.1 | 0.01 | 0.37 |
| A2: top right | 33.6 | 0.36 | 12.08 |
| A3: bottom left | 31.0 | 0.01 | 0.31 |
| A4: bottom right | 31.0 | 0.36 | 11.10 |

Here, the bottom left corner A3 of the bounding box has the lowest score. Therefore, at S210, this is taken as the anchor point A of the page frame 22 (FIG. 1). The page frame is drawn so that it is fully within the page 10, starting from this anchor point. The associated margin corner is used to define the direction for the page frame pfd to be drawn—if MC3 is the margin corner, for example, the anchor point A is treated as the bottom left corner of the detected page frame. In the case of A3 as A, this means the page frame 22 extends to the right and vertically up from this anchor point.

As noted above, when the best final score and/or distance is greater than a given value (e.g., half of the page width as default value), then no anchor point A is selected. Two options are possible in this case (depending of the type of document):

1. either no page frame is associated to the page, or
2. the page frame drawn by the projected margins (using md) is considered as the page frame (in this embodiment, all pages of the document have the same pfd).

Finally, empty pages have no page frame.

As will be appreciated, the page frame detected for any given page has the page frame dimensions pfd of the page frame computed at line 8 of Algorithm 1, but has margins which can be different from md, depending on the location of the anchor point A. In this way, each page 10 of the document (or at least those pages covered by the page frame), can have the same page frame dimensions (h,w) and respective (possibly different) margin dimensions (w1,w2,w3,w4).

Figure 12:
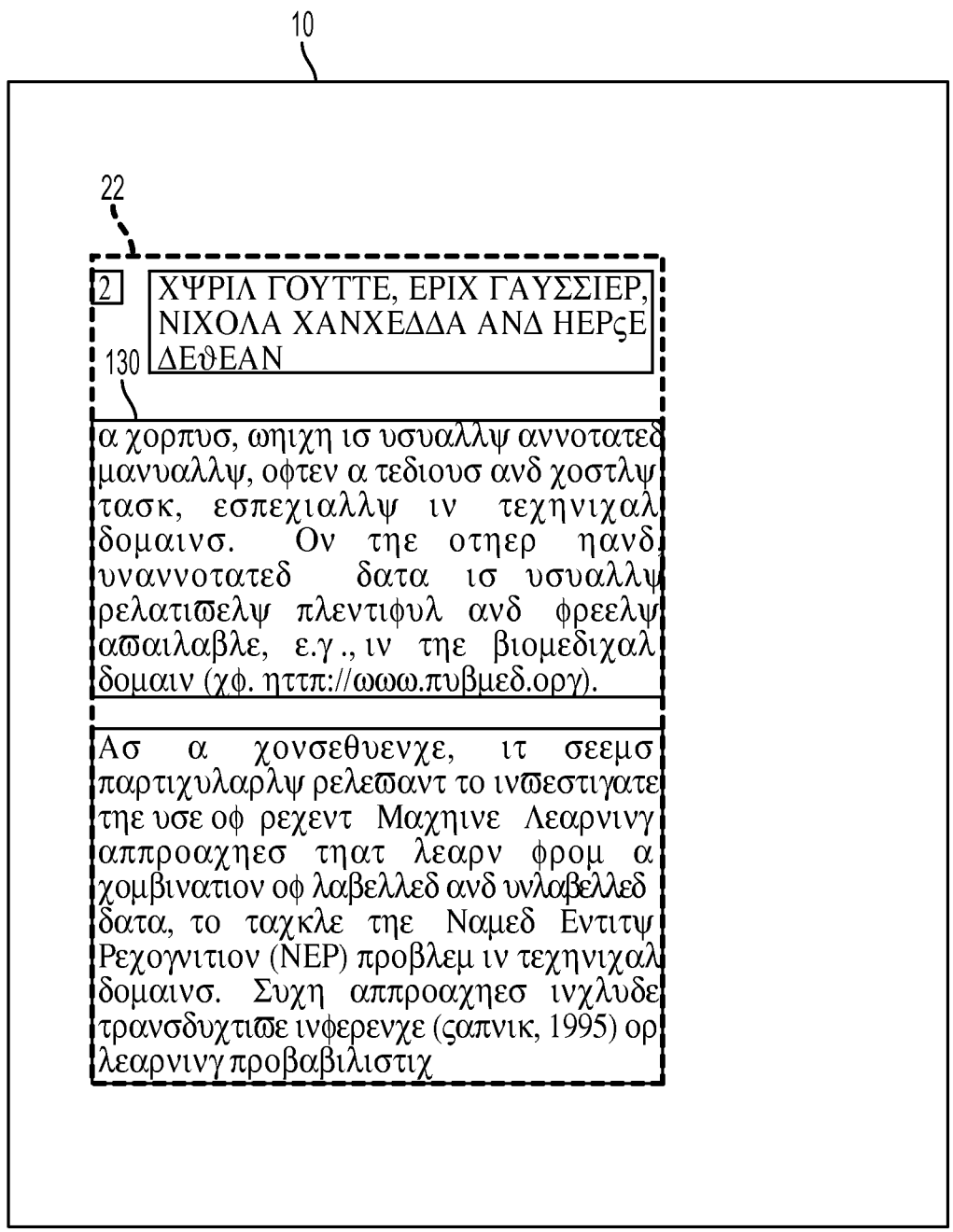
FIG. 12 illustrates the page of FIG. 10 after filtering content outside the detected page frame.

As output, the method generates a set of detected page frames, and associates with each page at most one page frame. After filtering page content that is not within the detected page frame 22, the resulting page 10 may be as schematically shown in FIG. 12.

The page frame object 130 (content of the detected page frame) output by the exemplary method can be used in various processing methods. As example, it may be used in a page template generation method, as described in above-mentioned application Ser. No. 12/773,125, or in a method for optical character recognition using zoning, as described in above-mentioned application Ser. No. 12/853,461.

Without intending to limit the scope of the exemplary embodiment, the following Examples illustrate the exemplary method.

EXAMPLES

A small quantitative evaluation was conducted for a scanned document. This document has 387 pages. Of these 387 pages, 100 have marginal noise. The method is able to correctly infer the correct dimensions of the page frame, and to correctly position the page frame in the page with an accuracy of 93%.

In a second evaluation, the method was tested on a large number of documents and visual validations were performed. The page frame dimensions and margin positions are almost always correctly computed. The matching step is generally correct (above 90%). The processing time of the method is extremely fast. For example, a 644 page document is processed in 5 s on a personal computer with a 2.99 GHz Intel processor.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for page frame detection for pages of a document comprising:
    receiving a set of document pages for a document, each page having at least one detected object;
    for each page in the set:
        determining dimensions of a bounding box which encompasses the detected objects of the page; and
        determining margin dimensions, based on a position of the bounding box on the page, the margin dimensions being computed relative to the page boundary;
    with a computer processor, computing a page frame as a combination of bounding box dimensions and margin dimensions, based on frequencies of the bounding box dimensions and margin dimensions computed for the set of pages, the computing of the page frame comprising:
        ranking the bounding box dimensions in order of frequency;
        ranking the margin dimensions in order of frequency;
        combining a most frequent one of the ranked bounding box dimensions with a most frequent one of the ranked margin dimensions; and
        determining whether the combination is compliant with dimensions of the pages, and if so, using the combination as the computed page frame, otherwise identifying a next most frequent one of the margin dimensions or bounding box dimensions and repeating the determining of whether the combination is compliant with the page dimensions until a compliant combination is identified;
    matching the computed page frame to pages of the set of document pages to detect page frames for the matched pages; and
    outputting information based on the detected page frames.

2. The method of claim 1, wherein the detected objects include textual noise.

3. The method of claim 1, wherein the computing of the page frame comprises:
    computing a first histogram of bounding box height and width frequency for the set of pages, where each pair of height and width is scored as a sum of respective height and width frequencies.

4. The method of claim 3, wherein the computing of the page frame comprises:
    computing a second histogram of margin frequency for the set of pages, wherein each combination of margin dimensions is scored as a sum of respective margin dimension frequencies.

5. The method of claim 1, wherein the determining of the margin dimensions comprises computing four margin dimensions for each page in the set of pages.

6. The method of claim 1, wherein the matching of the computed page frame to pages of the document comprises, for a page in the set of pages, identifying an anchor point and positioning a page frame on the page using the anchor point as a reference point.

7. The method of claim 6, wherein the identification of the anchor point comprises identifying a set of candidate anchor points, scoring each of the candidate anchor points, and identifying the anchor point based on the scores.

8. The method of claim 7, wherein the scoring is based on at least one of:
    a distance of the candidate anchor point to a closest corner of a rectangle defined by the margins of the page frame being matched; and
    a number of objects intersected by a detected page frame having page frame dimensions of the computed page frame if the candidate anchor point is taken as the anchor point.

9. The method of claim 1, further comprising:
    identifying a first set of received document pages comprising one of odd and even pages in the document;
    identifying a second set of received document pages comprising the other of odd and even pages of the document; and
    wherein a first page frame computed for the first set is matched with the pages in the first set and a second page frame computed for the second set is matched with pages in the second set.

10. The method of claim 1, wherein the outputting information comprises outputting objects of a document page that are within the detected page frame, whereby objects outside the detected page frame are excluded.

11. The method of claim 1, wherein the document pages comprise scanned pages and wherein the objects' sizes and positions on each page in the set of pages are output by an associated OCR engine.

12. The method of claim 1, wherein the objects comprise text objects.

13. The method of claim 1, wherein the set of pages comprises a sequence of at least four pages.

14. The method of claim 1, wherein the set of pages includes pages from no more than a single document.

15. A computer program product comprising a non-transitory recording medium encoding instructions, which when executed on a computer causes the computer to perform the method of claim 1.

16. A system comprising memory which stores instructions or performing the method of claim 1 and a processor in communication with the memory for executing the instructions.

17. A system for page frame detection for pages of a document comprising:
- memory for storing a set of document pages for a document in which objects in the pages have been detected;
- a bounding box computing component which, for each page in the set, computes dimensions of a bounding box which encompasses all detected objects of the page;
- a margin computing component which, for each page in the set, determines margin dimensions, based on a position of the bounding box on the page, the margin dimensions being computed relative to the page boundary;
- a histogram computing component which computes a first histogram of bounding box dimension frequencies and separately computes a second histogram of margin dimension frequencies, the first histogram being computed using the bounding box dimensions of all pages in the set, the second histogram being computed using the margin dimensions of all pages in the set;
- a page frame detection component which computes a page frame as a combination of bounding box dimensions and margin dimensions, based on the histograms of frequencies of the bounding box dimensions and margin dimensions, which page frame is compliant with dimensions of the document pages, and matches the computed page frame to pages of the set of document pages to detect page frames for the matched pages, the computing of the page frame comprising:
  - ranking the bounding box dimensions in order of frequency;
  - ranking the margin dimensions in order of frequency;
  - combining a most frequent one of the ranked bounding box dimensions with a most frequent one of the ranked margin dimensions; and
  - determining whether the combination is compliant with dimensions of the pages, and if so, using the combination as the computed page frame, otherwise identifying a next most frequent one of the margin dimensions or bounding box dimensions and repeating the determining of whether the combination is compliant with the page dimensions until a compliant combination is identified; and
- wherein at least one of the components is implemented by a computer processor.

18. A method for page frame detection for pages of a document comprising:
- receiving a set of pages generated by scanning a document and detecting text objects within the document pages, the set of pages comprising a sequence of consecutive or alternating pages of the document;
- for each page in the set, determining height and width dimensions of a bounding box which encompasses all detected text objects of the page and determining margin dimensions, based on a position of the bounding box on the page;
- ranking bounding box dimensions based on respective frequencies of the determined height and width dimensions for the set of pages;
- separately, ranking margin dimensions based on respective frequencies of the four determined margin dimensions for the set of pages;
- identifying a page frame, by combining a frequent one of the ranked bounding box dimensions and a frequent one of the ranked margin dimensions the page frame comprising a height and width and four margin dimensions;
- confirming that the identified page frame is compliant with dimensions of the pages in the set of pages;
- matching the computed page frame to pages of the set, comprising determining, for at least some of the pages in the set, an anchor point and using the anchor point as a reference for positioning a page frame on the respective page, whereby at least some of the pages of the document have a page frame of the same height and width as the computed page frame; and
- transforming the pages matched to the page frame by extracting text objects only from within the matched page frame.

19. The method of claim 1, wherein the matching of the computed page frame comprises matching at most one detected page frame to each of the pages.

* * * * *